April 11, 1950    P. S. VILES    2,503,977
DESALTING CRUDE PETROLEUM
Filed April 5, 1948
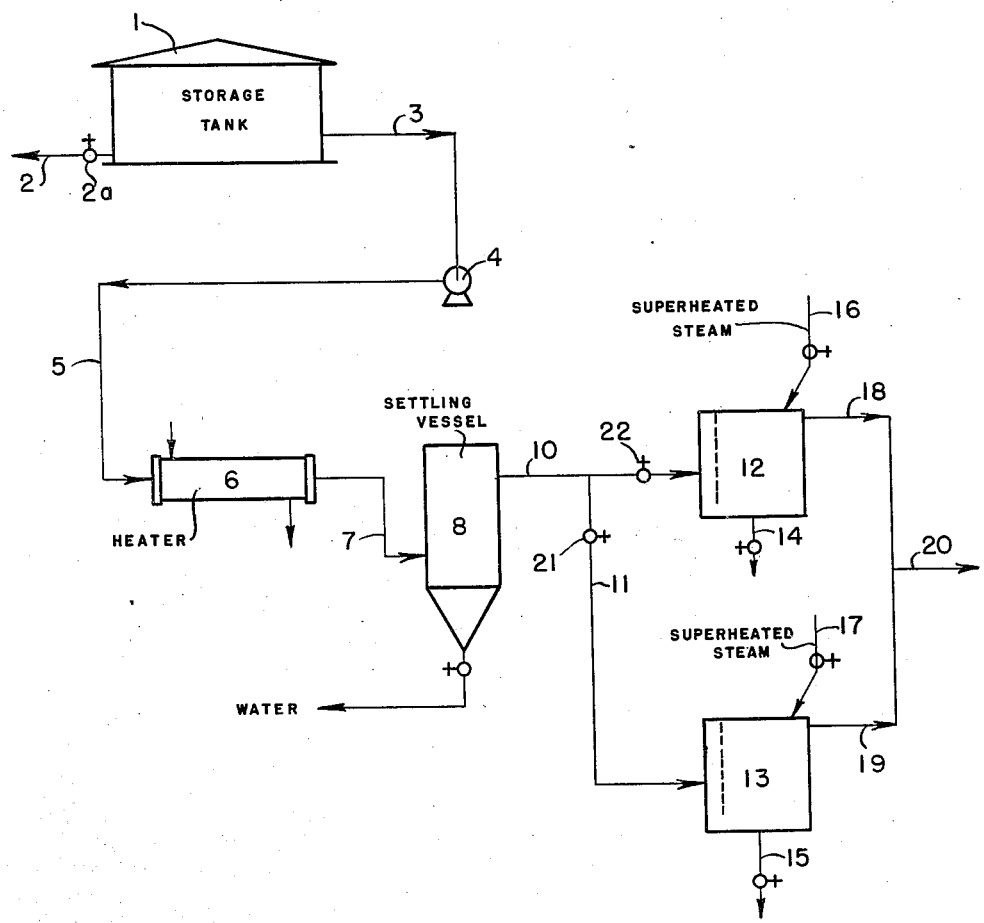
Prentiss S. Viles, INVENTOR.
BY
AGENT.

/ Patented Apr. 11, 1950

2,503,977

UNITED STATES PATENT OFFICE 2,503,977

DESALTING CRUDE PETROLEUM

Prentiss S. Viles, Goose Creek, Tex., assignor, by mesne assignments, to Standard Oil Development Company, Elizabeth, N. J., a corporation of Delaware Application April 5, 1948, Serial No. 18,911

9 Claims. (Cl. 252—327)

The present invention is directed to a process for removing inorganic salts from crude petroleum. More specifically, this invention is directed to the prevention of the formation of inorganic salt deposits in processing equipment during the refining of salt-bearing crude petroleum. It is further directed to the prevention of corrosion of metallic processing equipment that is due to hydrogen chloride formed by salts during the distillation of salt-bearing crude petroleum.

It is well known that crude petroleum, which is produced from the various geological formations of the earth, contains varying amounts of naturally occurring inorganic salts either in the form of brine solution or as entrained salt crystals. Another source of inorganic salt in crude petroleum is the practice of introducing acid into various types of producing formations to cause the crude to flow more freely to the well. The hydrochloric acid reacts with the minerals in the formation and produces the inorganic salts which are carried along with the oil and later may cause deleterious effects in refining equipment. It is also well known that the presence of these inorganic salts contributes materially to the difficulties of processing crude oils by causing salt deposits to form in heat exchange or other equipment and by causing corrosion at various points in the processing equipment due to the hydrogen chloride which is formed by hydrolysis of the salts during distillation. In fact, the presence of acid in distillation equipment is often so serious that the equipment may become corroded to the extent that serious fires may result. Also the salt deposits may cause shut-down of the equipment with a resultant uneconomical operation. Thus, it is readily seen that the removal of these salts from the crude before distillation would be very desirable.

The primary object of this invention is to provide a process for the removal of essentially all of the inorganic chlorides and/or other inorganic salts prior to distillation of the crude petroleum. It is also another object of this invention to provide a process for continuous removal of these salts, thus minimizing down times of the processing equipment due to the plugging action of the salt deposits and to the corrosion of equipment by the hydrolysis products of the salts during processing operations.

In accordance with the present invention it has been found that heating crude petroleum containing inorganic salts to temperatures in the range from about 100° to about 400° F. results in substantially complete solution of waxes and asphaltic bodies or similar material which ordinarily at atmospheric temperature are not completely dissolved in the crude petroleum. The heating should be conducted under a sufficiently high pressure so that the naturally occurring brine and wet salt crystals remain in the condition in which they exist originally. It is believed that the brine and wet salt crystals may exist in the crude petroleum as particles surrounded by waxy or asphaltic petroleum fractions. Following the heating, the crude petroleum is contacted with a dehydrating medium which will remove substantial quantities of the inorganic salts from the crude petroleum.

Briefly, then, the present invention may be described as involving the heating of crude petroleum which is substantially free from water, and without the addition of water, to a temperature in a range of about 100° to 400° F. and under a pressure ranging from atmospheric to about 500 pounds per square inch gauge. The heated oil is then contacted with a dehydration medium including an inorganic salt such as a halide which has the ability to become hydrated and dehydrated. Contact with the dehydrating medium effectively reduces the salt content of the crude petroleum.

As examples of the inorganic salts finding use in the present invention as dehydrating media may be mentioned the halides of beryllium, magnesium, calcium, strontium, and barium. It is preferred to employ the chlorides of the foregoing metals and it is preferred to employ calcium chloride as the dehydration medium in the practice of the present invention. The dehydration medium is to be employed in a condition of substantially incomplete hydration so that, when the crude petroleum is contacted with it at temperatures and pressures in the ranges given, it may effectively remove brine and salt crystals therefrom. While the chlorides are preferred, other halides of the metals mentioned such as the bromides and iodides of magnesium, calcium, strontium, barium, and the like, may be used.

The invention will now be illustrated in more detail with reference to the drawing in which the single figure presents one mode of practicing the same. Referring now to the drawing, numeral 1 designates a storage tank containing crude petroleum from which water, separated therefrom by gravity settling, may be removed by line 2 controlled by valve 2a. The crude petroleum, substantially free of all water which will separate under the influence of gravity under the near-atmospheric conditions maintained in tank 1, is discharged from tank 1 by line 3, pump 4, and line 5 into a heating device 6, which may conveniently be a heat exchanger or a heating coil, or the like. In heat exchanger 6 the temperature is raised to a temperature in the range from about 100 to 400° F. while the pressure is maintained at about 100 pounds per square inch by pump 4. The heated crude oil is then discharged from exchanger 6 by line 7 into a settling vessel 8, where additional water is allowed to separate under the influence of gravity. The water may be drawn off, while the crude petroleum, from which the water has been separated, is discharged from vessel 8 by line 10 to either or both of the calcium chloride drums 12 and 13 by manipulation of valves 21 and 22 in manifold 11. It will be understood that drums 12 and 13 may be used alternately one being used while the other is being regenerated; assuming that oil is routed to drum 13 as shown in the figure, the desalted oil is discharged from drum 13 by lines 19 and 20 and routed to a distillation zone, not shown. While drum 13 is in operation the calcium chloride in drum 12 is being dehydrated by passage of superheated steam in contact with the substantially hydrated inorganic salt. The superheated steam may be introduced to drum 12 by line 16 and the material removed from the calcium chloride discharged by line 14. When the calcium chloride in drum 13 becomes spent, valve 21 is closed and valve 22 opened, allowing the regenerated calcium chloride in drum 12 to be placed in the operating stream. The calcium chloride in drum 13 is then caused to undergo the regeneration cycle by the admission of superheated steam by line 17. The material absorbed by the substantially saturated calcium chloride is driven off and removed from drum 13 by line 15.

Ordinarily the calcium chloride in drums 12 and 13 will, after use, be wetted by a film of crude petroleum. Therefore, it may be necessary, prior to the regeneration of the calcium chloride in drums 12 and 13, to purge the oil from the calcium chloride in drums 12 and 13 substantially completely. The oil may be displaced from the calcium chloride in drums 12 and 13 by the superheated steam employed to regenerate the calcium chloride. Under some conditions it may be desirable to wash the calcium chloride in drums 12 and 13, prior to the displacement, with light petroleum naphtha to remove substantially completely the crude petroleum therefrom. It also may be desirable, under some conditions, to wash the beds with water to prevent buildup of salt thereon.

When operating at substantially elevated pressures, for example, at about 200 to 500 p. s. i. g. and at temperatures in the range of between 100° to 400° F., it may be unnecessary to add superheated steam to remove water from the beds in drums 12 and 13. This may be done conveniently by displacing the crude oil from the beds in drums 12 and 31 by purging with an organic fluid such as a light hydrocarbon in the naphtha boiling range and then suddenly releasing the pressure in drums 12 and 13, thus causing the water to flash from the hydrated calcium chloride and to allow it to become substantially dehydrated and in condition for future use in the process.

In order to illustrate the present invention further, runs were made in which portions of crude oil from the Panhandle Field in Texas were contacted, in one instance, with a 2 inch layer of anhydrous calcium chloride at atmospheric pressure and at a temperature of 80° F., and in another instance the same crude petroleum was contacted at atmospheric pressure and at a temperature of 150° F. with a 2 inch layer of anhydrous calcium chloride.

In the following table a comparison is made in which the salt content of the untreated Panhandle crude is compared with the salt content of the portion which was percolated through calcium chloride at atmospheric pressure and a temperature of 80° F. and the Panhandle crude percolated at a temperature of 150° F. through a bed of calcium chloride.

|  | Panhandle Crude untreated | Panhandle Crude percolated through 2 in. layer of anhydrous CaCl₂ at atmospheric pressure and 80° F. | Panhandle Crude percolated through 2 in. layer of anhydrous CaCl₂ at atmospheric pressure and 150° F. |
| --- | --- | --- | --- |
| Salt content of Crude, pounds/1000 Bbl | 107.8 | 374.5 | 38.3 |

The foregoing comparisons show that the untreated crude had a salt content of approximately 108 pounds per thousand barrels while the crude which had been contacted at 80° F. with the calcium chloride had a salt content of approximately 375 pounds per thousand barrels. In the practice of the present invention the salt content of the crude was reduced from 108 pounds per thousand barrels to approximately 38 pounds per thousand barrels.

The mechanism of the process is not fully understood; however, it is postulated that in salt-carrying crude oil, particles of brine, probably colloidal in size, and very small, wet salt crystals are encased by wax or asphaltic materials which, are of nearly the same density as the surrounding crude oil, and thus gravity settling of the colloidal brine and wet salt particles is impossible. Also, the encasement of the particles prevents their intimate contact with any adsorbent at temperatures less than the melting points of the waxy or asphaltic coatings. It is believed that, when the temperature of the crude oil is raised above the melting point of the waxy and asphaltic materials, these materials go into solution in the crude oil and leave free particles of brine and salt crystals floating in the crude oil as long as the pressure is sufficiently high to prevent the water from vaporizing. It is further postulated that calcium chloride has an affinity for both the brine and wet salt crystals because of its hygroscopic characteristics. However, it is understood that any theory expressed herein shall not be binding as to any beneficial effects which inure to the above described process.

It is indeed surprising that contacting the heated oil at an elevated temperature with a dehydrating medium substantially reduces the salt content of the crude petroleum, since the prior art teachings have been to add water to the crude petroleum to form emulsons deliberately, and then coalesce the emulsions with a coagulating bed. In the present invention the salts are removed by a mechanism which is believed to involve removing water. This feature of the invention is very important since in the prior art processes water is added, of which a small amount may remain in the desalted crude. This water may be very troublesome when the crude is subsequently distilled. It will be apparent that the present invention avoids these difficulties.

While the invention has been described and illustrated with reference to an example in which two beds have been used alternatively, it will be understood by the skilled workman that a plurality of beds may be employed; for example, one, two, three, four or more beds may be employed, with the salt-containing crude petroleum in a heated condition being routed to the beds until one or more of them become spent. Thus, operation may be continued while the spent bed or beds are undergoing the regeneration cycle. Other modifications of my invention will present themselves to the skilled workman, which I consider to be within its spirit and scope.

The nature and objects of the present invention having been fully described and illustrated, what I wish to claim as new and useful and to secure by Letters Patent is:

1. A method for removing inorganic salts from substantially water-free crude petroleum containing them which comprises heating said crude petroleum to a temperature in the range between 100° F. and 400° F., and contacting the heated crude petroleum with a bed of a halide of a metal selected from the left-hand column of group II of the periodic table at a pressure sufficient to maintain a liquid phase, said halide having the ability to become hydrated and dehydrated, and removing said crude petroleum from contact with said bed.

2. A method in accordance with claim 1 in which the metal selected from group II is calcium.

3. A method in accordance with claim 1 in which the metal selected from group II is magnesium.

4. A method in accordance with claim 1 in which the metal selected from group II is strontium.

5. A method for desalting substantially water-free crude petroleum containing inorganic salts which comprises forming a bed of halide of a metal selected from the left-hand column of group II of the periodic table, heating said substantially water-free crude petroleum containing inorganic salts to a temperature in the range between 100° and 400° F., said halide having the ability to be hydrated and dehydrated, contacting the heated crude petroleum with said bed while maintaining the temperature of the heated petroleum between 100° and 400° F. and at a pressure in the range between atmospheric and 500 pounds per square inch gauge, from removing substantially desalted crude petroleum from contact with said bed.

6. A method for desalting substantially water-free crude petroleum containing inorganic salts which comprises forming a plurality of beds of a halide of a metal selected from the left-hand column of group II of the periodic table, said halide having the ability to be hydrated and dehydrated, heating said substantially water-free crude petroleum containing salts to a temperature in the range between 100° and 400° F., contacting the heated crude petroleum with at least one of said plurality of beds while maintaining the crude petroleum at a temperature in the range between 100° and 400° F. and at a pressure in the range between atmospheric and 500 pounds per square inch gauge until said bed has become substantially hydrated, terminating contact of said heated crude petroleum with said first bed, contacting said heated crude petroleum with at least a second of said plurality of beds while maintaining the temperature and pressure of the crude petroleum and said second bed within the range between 100° F. and 400° F. and in the range between atmospheric and 500 pounds per square inch gauge, regenerating said first bed, and returning said first bed to contact additional quantities of said heated crude petroleum.

7. A method for desalting substantially water-free crude petroleum containing inorganic salts which comprises forming a plurality of beds of a halide of a metal selected from the left-hand column of group II of the periodic table, said halide having the ability to be hydrated and dehydrated, heating said substantially water-free crude petroleum containing dissolved salts to a temperature in the range between 100° and 400° F., contacting the heated crude petroleum with at least one of said plurality of beds while maintaining the crude petroleum at a temperature in the range between 100° and 400° F. and at a pressure in the range between atmospheric and 500 pounds per square inch gauge until said bed has been substantially hydrated, terminating contact of said heated crude petroleum with said first bed, contacting said heated crude petroleum with at least a second of said plurality of beds, while maintaining the temperature and pressure of the crude petroleum and said second bed within the range between 100° and 400° F. and in the range between atmospheric and 500 pounds per square inch gauge, removing water from said first bed to regenerate same and returning said first bed to contact additional quantities of said heated crude petroleum.

8. A method for removing inorganic salts and brine from crude petroleum containing them which comprises separating brine from said crude petroleum by gravity, heating said crude petroleum from which brine has been separated to a temperature in the range between 100° F. and 400° F. and contacting the heated crude petroleum with a bed of calcium chloride at a pressure sufficient to maintain a liquid phase, and removing desalted crude petroleum from contact with said bed.

9. A method for removing inorganic salts and brine from crude petroleum containing them which comprises separating brine from said crude petroleum by gravity, heating said crude petroleum from which brine has been separated to a temperature in the range between 100° F. and 400° F., separating additional quantities of brine from said crude petroleum by gravity and contacting the heated crude petroleum from which brine has been separated with a bed of calcium chloride at a pressure sufficient to maintain a liquid phase, and removing desalted crude petroleum from contact with said bed.

PRENTISS S. VILES.

REFERENCES CITED

The following references are of record in the file of this patent:

UNITED STATES PATENTS

| Number | Name | Date |
| --- | --- | --- |
| 1,739,834 | Gard et al. | Dec. 17, 1929 |

OTHER REFERENCES

Bureau of Mines, Report of Investigations No. 3422, October 1938, "Desalting Crude Petroleum." A review of the literature, by Christianson et al., pages 12 and 13.

Bureau of Mines, Reports of Investigations, Serial No. 2688, May 1925, "Methods Used for Dehydration of Oil-Field Emulsions," by Dow, page 7.